United States Patent
Hubbell et al.

(10) Patent No.: US 10,807,528 B1
(45) Date of Patent: Oct. 20, 2020

(54) SYSTEM AND METHOD FOR ENHANCING DRIVER SITUATION AWARENESS AND ENVIRONMENT PERCEPTION AROUND A TRANSPORATION VEHICLE

(71) Applicant: Spirited Eagle Enterprises, LLC, Farmington, MI (US)

(72) Inventors: Jerry K. Hubbell, Farmington, MI (US); Alan C. Lesesky, Charlotte, NC (US); Steven Allen Osborne, Lancaster, SC (US)

(73) Assignee: Spirited Eagle Enterprises, LLC, Farmington, MI (US)

( * ) Notice: Subject to any disclaimer, the term of this patent is extended or adjusted under 35 U.S.C. 154(b) by 0 days.

(21) Appl. No.: 16/573,443

(22) Filed: Sep. 17, 2019

Related U.S. Application Data

(63) Continuation of application No. 15/521,122, filed as application No. PCT/US2015/056700 on Oct. 21, 2015, now Pat. No. 10,414,338.

(Continued)

(51) Int. Cl.
*B60Q 1/00* (2006.01)
*B60Q 9/00* (2006.01)
(Continued)

(52) U.S. Cl.
CPC ............ *B60Q 9/008* (2013.01); *G01S 13/931* (2013.01); *G08G 1/16* (2013.01); *G08G 1/166* (2013.01);
(Continued)

(58) Field of Classification Search
None
See application file for complete search history.

(56) References Cited

U.S. PATENT DOCUMENTS 7,131,748 B2  11/2006  Kazar et al.
7,324,039 B2   1/2008  Boltovets et al.
(Continued)

OTHER PUBLICATIONS

H.L. Bloecher, A. Sailor, G. Rollmann, and J. Dickmann; "79GHz UWB automotive short range radar—Spectrum allocation and technology trends" Adv. Radio Sci., 7, 61-65, 2009; www.adv-radio-sci.net/7/61/2009.

(Continued)

*Primary Examiner* — Brent Swarthout
(74) *Attorney, Agent, or Firm* — Schwartz Law Firm, P.C.

(57) ABSTRACT

A system for enhancing driver situation awareness and environment perception around a transportation vehicle. The system incorporates a plurality of object detecting sensors. The sensors are arranged for monitoring at least one critical zone around the vehicle. A plurality of addressable light-emitting diodes are operatively associated with the object detecting sensors. The addressable light-emitting diodes are located on the vehicle for visual display to the driver. When a given sensor detects an object in the critical zone, a detection signal is transmitted to a LED controller. Upon receiving the detection signal, the LED controller transmits a control signal to selectively activate only those addressable light-emitting diodes which are associated with the given sensor, such that the activated light-emitting diodes visually communicate to the driver a location of the detected object in the critical zone.

16 Claims, 12 Drawing Sheets

Related U.S. Application Data

(60) Provisional application No. 62/115,378, filed on Feb. 12, 2015, provisional application No. 62/122,440, filed on Oct. 21, 2014.

(51) Int. Cl.
*G01S 13/931* (2020.01)
*G08G 1/16* (2006.01)
*G01S 7/04* (2006.01)

(52) U.S. Cl.
CPC ............. *G08G 1/167* (2013.01); *G08G 1/168* (2013.01); *G01S 7/04* (2013.01); *G01S 2013/9315* (2020.01); *G01S 2013/93271* (2020.01); *G01S 2013/93272* (2020.01); *G01S 2013/93274* (2020.01)

(56) References Cited

U.S. PATENT DOCUMENTS

| | | | |
|---|---|---|---|
| 7,605,547 | B2 | 10/2009 | Ng |
| 7,817,019 | B2 | 10/2010 | Lesesky |
| 8,645,001 | B2 * | 2/2014 | Basson ................. G08G 1/167 359/22 |
| 2002/0075138 | A1 * | 6/2002 | Van Rees ........... B60K 31/0008 340/436 |
| 2007/0182527 | A1 * | 8/2007 | Traylor ................. B60Q 9/008 340/435 |
| 2013/0075769 | A1 | 3/2013 | Yan et al. |
| 2013/0100287 | A1 | 4/2013 | Chien et al. |

OTHER PUBLICATIONS

Ralph Mende and Andre Zander; "A Multifunctional Automotive Short Range Radar System" s.m.s. smart microwave sensors GmbH; Braunschweig, Germany; Volkswagen AG; Wolfsburg, Germany.

* cited by examiner

Right Hand Mirror

SYSTEM AND METHOD FOR ENHANCING DRIVER SITUATION AWARENESS AND ENVIRONMENT PERCEPTION AROUND A TRANSPORATION VEHICLE

This application is a continuation of application Ser. No. 15/521,122, filed Apr. 21, 2017, now U.S. Pat. No. 10,414,338.

TECHNICAL FIELD AND BACKGROUND OF THE INVENTION

This invention relates broadly and generally to a system and method for enhancing driver situation awareness and environment perception in a transportation vehicle. In exemplary embodiments, discussed further herein, the invention involves components, features, and technology for improving a driver's ability to perceive objects during bad optical visibility or objects hidden in blind spots during start-up, reversing, parking, changing lanes, and other vehicle maneuvers.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a method for enhancing driver situation awareness and environment perception around a transportation vehicle. The method includes locating a plurality of object detecting sensors on the vehicle. The sensors are arranged for monitoring at least one critical zone around the vehicle. A plurality of (individual) addressable light-emitting diodes are operatively associated with the object detecting sensors. The addressable light-emitting diodes are located on the vehicle for visual display to the driver. When a given sensor detects an object in the critical zone, a detection signal is transmitted to a LED controller. Upon receiving the detection signal, the LED controller transmits a control signal to selectively activate only those (one or more) addressable light-emitting diodes which are associated with the given sensor, such that the activated light-emitting diodes visually communicate to the driver a location of the detected object in the critical zone.

The term "transportation vehicle" refers broadly herein to a wide variety of vehicles including, for example, heavy duty tractors, trailers for heavy duty tractors, light trucks, RVs, SUVs, passenger vehicles, boat and other trailers, golf carts, all-terrain vehicles, recreational vehicles, military vehicles, trains, buses, aircraft, watercraft, and the like.

The term "critical zone" is defined herein as any area around the vehicle which is not readily visible or perceived by a driver during start-up, reversing, parking, turning, changing lanes, or other vehicle maneuver. The area around the vehicle may be divided into multiple adjacent, overlapping, or spaced-apart (discontinuous) critical zones. In a multi-zone area around the vehicle, a single ALED may associate with a single sensor in a single critical zone to indicate perceived movement of a detected object from one zone to an adjacent zone. Alternatively, multiple ALEDs may associate with multiple sensors in a single critical zone to indicate perceived movement of a detected object within the zone. Alternatively, a single ALED may associate with a single sensor or multiple sensors in multiple critical zones. Each ALED may comprise a data-in pin, a power pin, a ground pin, and a data-out pin.

According to another exemplary embodiment, the addressable light-emitting diodes are integrated in a mirror mounted to the vehicle.

According to another exemplary embodiment, the light-emitting diodes are arranged in a single line (e.g., vertical column) along at least one marginal edge of the mirror, the line of light-emitting diodes representing one or more critical zones along one side of the vehicle.

According to another exemplary embodiment, the light-emitting diodes are arranged in multiple adjacent lines (e.g., vertical columns) along at least one marginal edge of the mirror, each line of light-emitting diodes representing one or more critical zones along one side of the vehicle. Alternatively, the pillar areas inside the vehicle cab may comprise LCD mirror-like displays which reflect the ALEDs illuminated on the vehicle side mirror for ready and convenient viewing by the driver.

According to another exemplary embodiment, the addressable light-emitting diodes are integrated in a square mirror mounted to the vehicle, and arranged in separate top, bottom, right, and left lines along respective top, bottom, right, and left marginal edges of the mirror. The top and bottom (horizontal) lines of light-emitting diodes represent one or more critical zones located at a front and rear of the vehicle. The right and left (vertical) lines of light-emitting diodes represent one or more critical zones along the right and left side of the vehicle.

According to another exemplary embodiment, the addressable light-emitting diodes are integrated in a LED display box mounted on a trailer pulled by the vehicle. The LED display box is located for visual display to the driver through a rearwardly directed exterior mirror mounted on the vehicle.

According to another exemplary embodiment, the addressable light-emitting diodes are integrated in a cabin display device located inside the passenger compartment of the vehicle.

According to another exemplary embodiment, the object detecting sensors comprise a plurality of radar transceivers (with 2 antennas) adapted to direct radar waves into the critical zone, and to receive reflected radar waves from any objects located in the critical zone.

According to another exemplary embodiment, the radar transceivers comprise (ultra-wideband) short-range radar.

According to another exemplary embodiment, the plurality of radar transceivers comprise at least one pair of forward facing and rearward facing short-range radars.

In another exemplary embodiment, the disclosure comprises a system for enhancing driver situation awareness and environment perception around a transportation vehicle. The system comprises a plurality of object detecting sensors adapted for being located on the vehicle, and arranged for monitoring at least one critical zone around the vehicle. A plurality of addressable light-emitting diodes are operatively associated with the object detecting sensors, and adapted for being located on the vehicle for visual display to the driver. A LED controller is adapted for receiving a detection signal when a given sensor detects an object in the critical zone. The LED controller transmits a control signal to selectively activate only those (one or more) addressable light-emitting diodes which are associated with the given sensor, such that the activated light-emitting diodes visually communicate to the driver a location of the detected object in the critical zone.

In yet another exemplary embodiment, the disclosure comprises a transportation vehicle incorporating a system for enhancing driver situation awareness and environment perception. The transportation vehicle comprises a plurality of object detecting sensors located on the vehicle, and arranged for monitoring at least one critical zone around the vehicle. A plurality of addressable light-emitting diodes are operatively associated with the object detecting sensors, and located on the vehicle for visual display to the driver. A LED controller is adapted for receiving a detection signal when a given sensor detects an object in the critical zone. The LED controller transmits a control signal to selectively activate only those (one or more) addressable light-emitting diodes which are associated with the given sensor, such that the activated light-emitting diodes visually communicate to the driver a location of the detected object in the critical zone.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
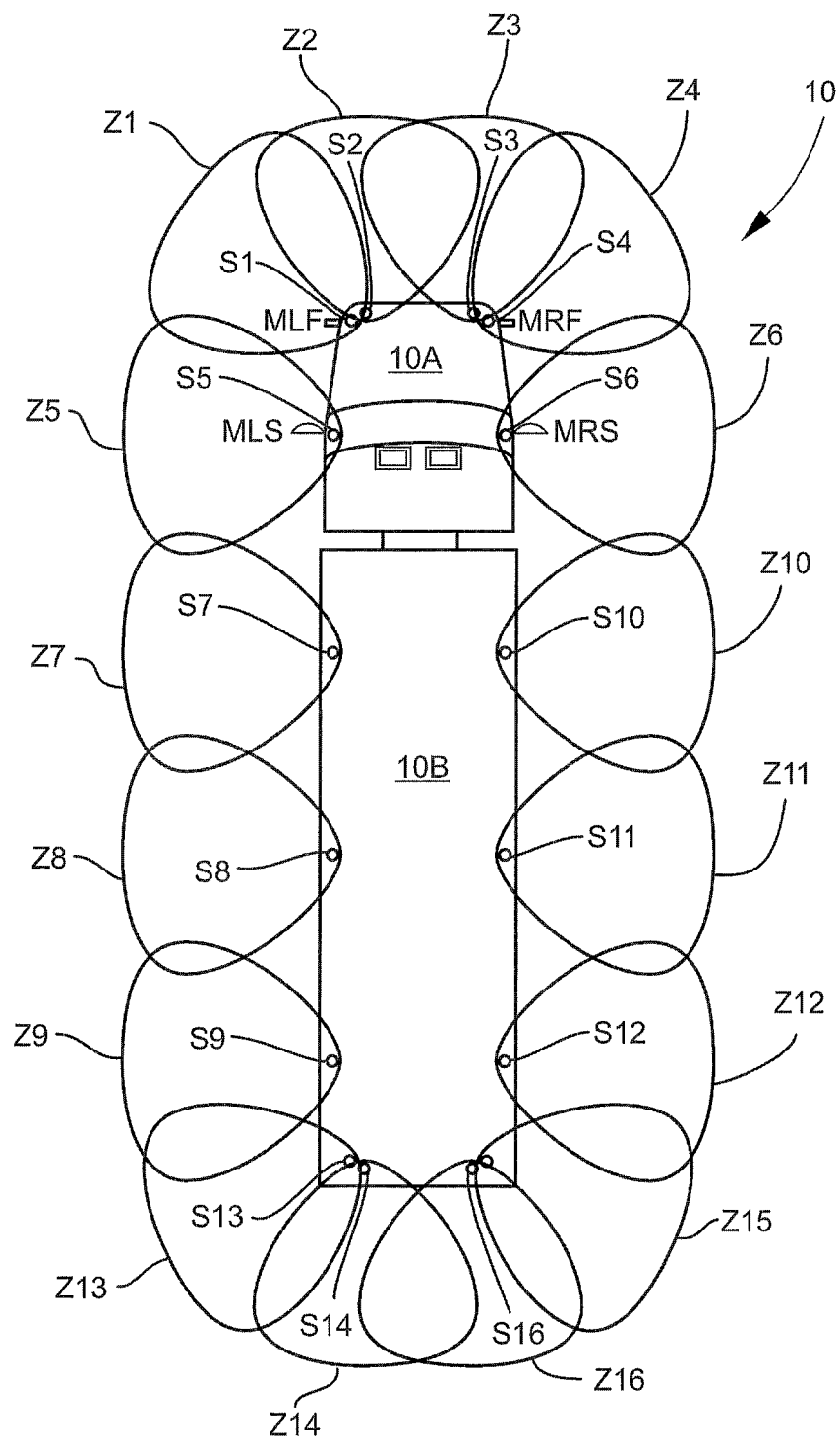
FIG. 1 is a plan view of a tractor-trailer vehicle incorporating object-detecting sensors designed detect perceived objects in various critical zones around the vehicle.

Referring now specifically to the drawings, the present disclosure comprises a system and method for enhancing driver situation awareness and environment perception around a transportation vehicle, such as a heavy duty tractor-trailer vehicle 10 shown in FIG. 1. In an exemplary embodiment, the vehicle 10 comprise a plurality of electronic object-detecting sensors S1-S16 strategically located on an exterior of the tractor 10A and trailer 10B—for example, four front sensors S1-S4 on the tractor 10A, two side sensors S5, S6 on the tractor 10A, six side sensors S7-S12 on the trailer 10B, and four rear sensors S13-S16 on the trailer 10B. Collectively, the 16 vehicle sensors S1-S16 function to monitor a corresponding 16 overlapping "critical zones" Z1-Z16 extending 360-degrees around the vehicle 10. The critical zones Z1-Z16 constitute areas around the vehicle which may not be readily visible or perceived by a driver during start-up, reversing, parking, turning, changing lanes, or other vehicle maneuver. The exemplary sensors S1-S16 may comprise radar, sonic, laser, camera/video, optic, or any combination thereof.

Figures 2, 2A, 2B:
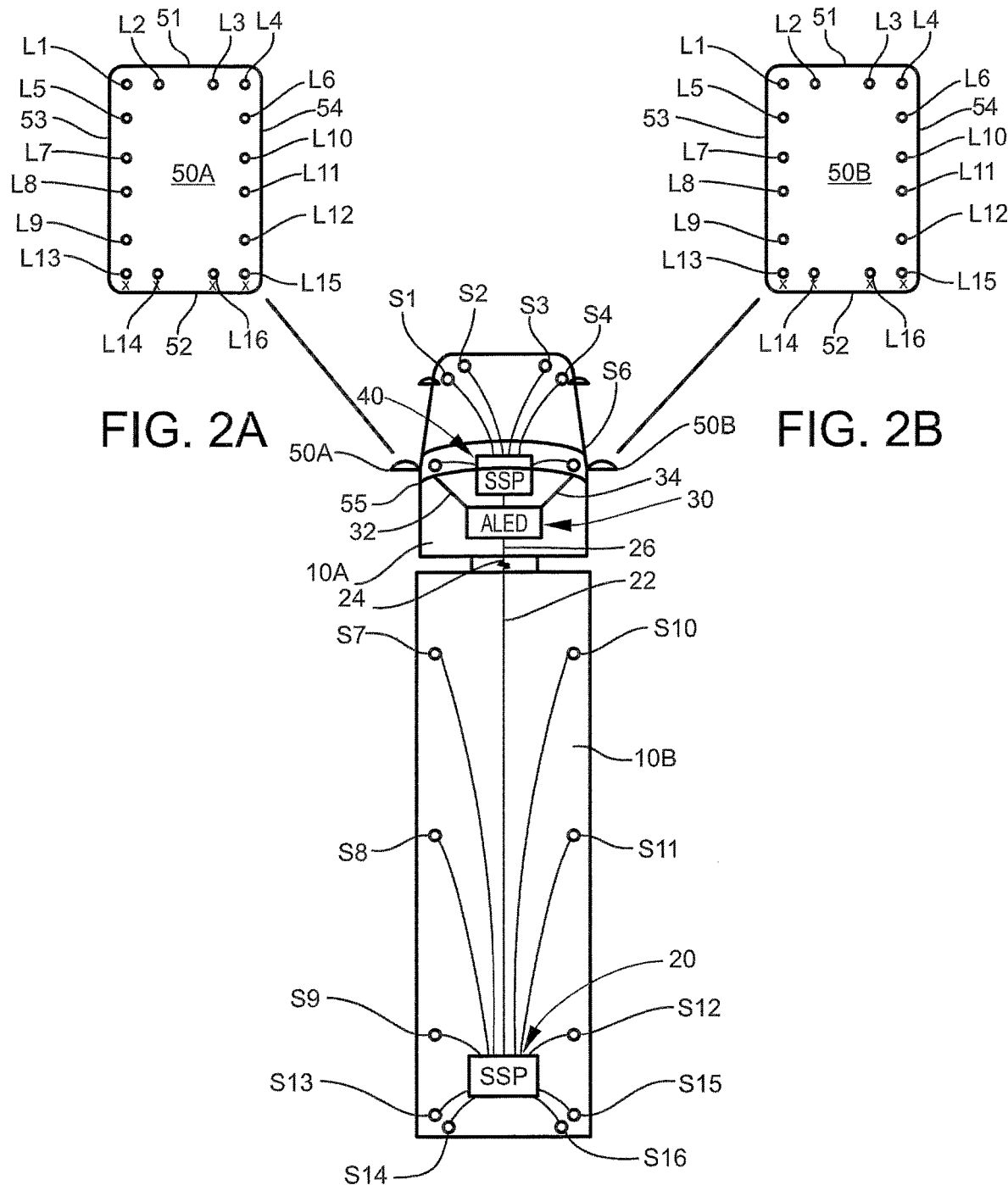
FIG. 2 is a further plan view of the exemplary tractor-trailer vehicle illustrating connection of the various sensors to sensor signal processors and a LED control module.
FIG. 2A is front view of a left vehicle side mirror incorporating ALEDs according to one exemplary embodiment of the present disclosure.
FIG. 2B is front view of a right vehicle side mirror incorporating ALEDs according to one exemplary embodiment of the present disclosure.
Figure 3:
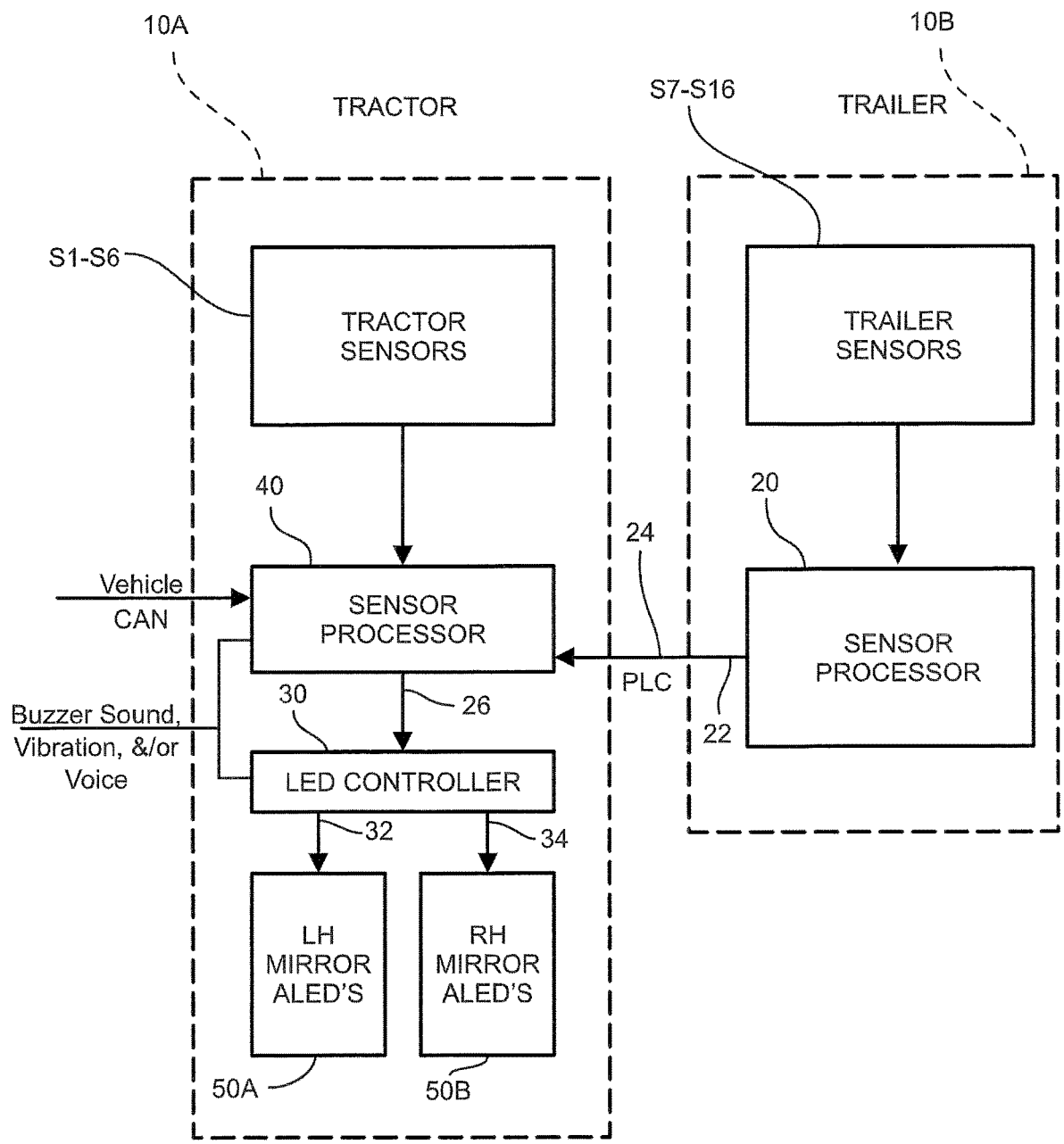
FIG. 3 is a schematic diagram illustrating various components and features of the present system in the exemplary tractor-trailer vehicle.
Figure 4:
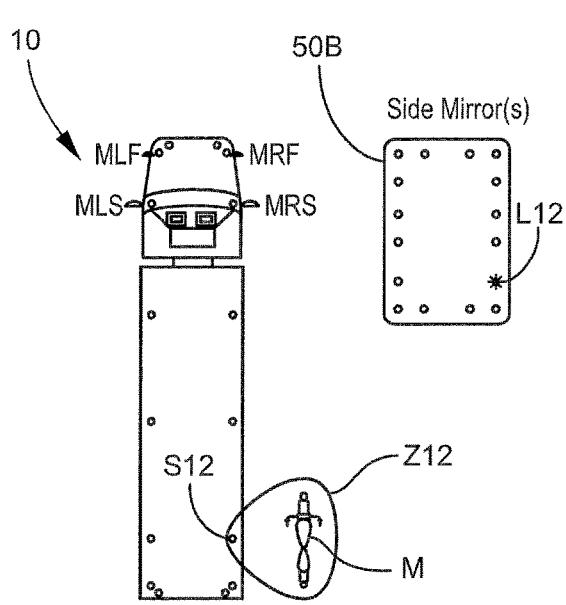
FIGS. 4-7 are sequential views demonstrating an exemplary implementation of the present system and method.
Figure 5:
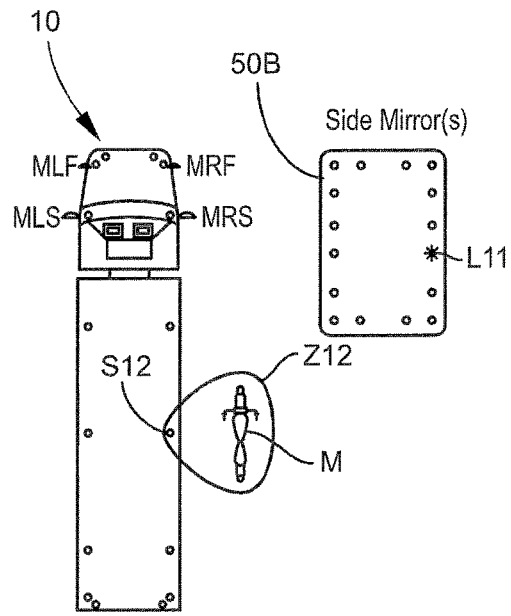
Figure 6:
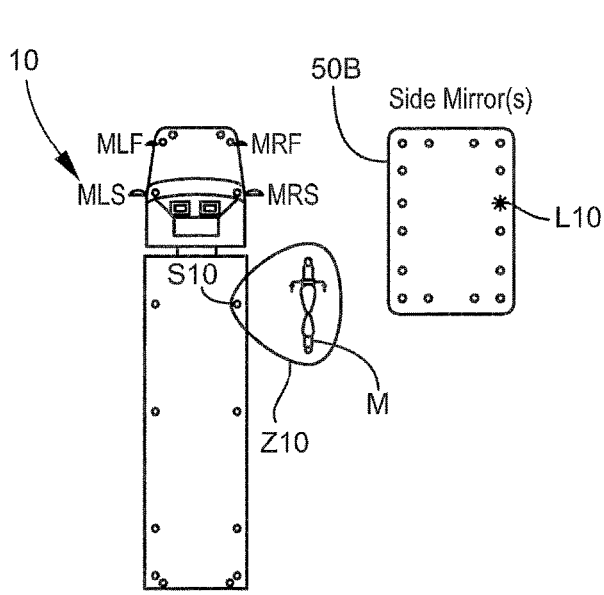
Figure 7:
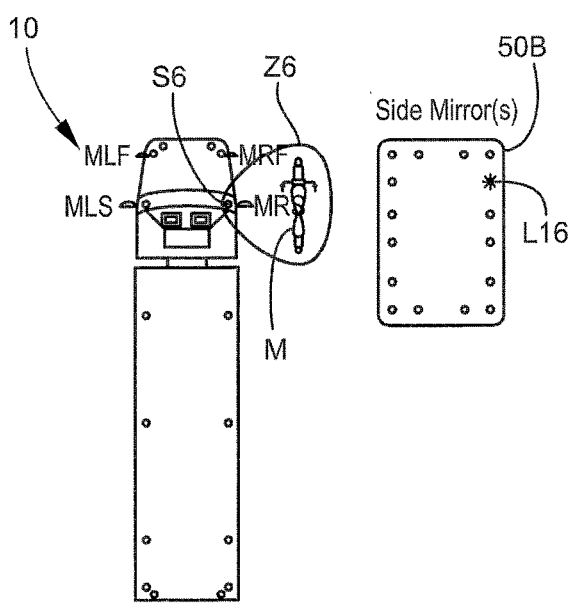

As shown in FIGS. 2 and 3, the sensors S7-S16 are electronically connected via wires to a first sensor signal processor 20 located on the trailer 10B for collecting and processing sensor data signals, and comprising a transceiver for transmitting the data signals to the tractor 10A along an existing vehicle buss 22, (such as AUX power buss) according to technology described in prior U.S. Pat. No. 7,817,019. The complete disclosure of the '019 Patent is incorporated by reference in the present application. From the AUX power buss 22, the data signals are transmitted across connector 24 (SAE J1067) and along the vehicle's power line carrier 26 (SAE J2497) or other data buss to a LED controller 30. The exemplary LED controller 30 comprises a microprocessor, transceiver, and other computer hardware and control circuitry. A second signal processor 40 is located in the tractor 10A, and comprises a transceiver for receiving data signals transmitted via wires by the various tractor sensors S1-S6. The second signal processor 40 connects to the LED controller 30 via power line carrier 26 or other data buss, and may communicate wirelessly with the first sensor signal processor 20 via WIFI, BLUETOOTH, or other known wireless standards. The LED controller 30 connects via wires 32, 34 to arrays of addressable light-emitting diodes (ALEDs) L1-L16 arranged in vehicle side mirrors 50A, 50B. The ALEDs L1-L16 are located and function in both side mirrors 50A, 50B in an identical manner. In an alternative embodiment, the electronic sensors S1-S16 may transmit signals wirelessly (e.g., via WIFI or BLUETOOTH) to the first and second sensor signal processors 20 and 40, which may then process and communicate the data signals wirelessly to the LED controller 30.

Referring to FIGS. 2A and 2B, each of the vehicle side mirrors 50A, 50B comprises integrated ALEDs L1-L16 arranged in separate top, bottom, left and right (single-file) lines along respective top, bottom, left, and right marginal edges 51, 52, 53, 54 of the mirror 50A, 50B. The top and bottom ALEDs L1-L4 and L13-L16 represent respective critical zones Z1-Z4 and Z13-Z16 around a front and rear of the vehicle 10, as monitored by front and rear sensors S1-S4 and S13-S16, while the left and right ALEDs L7-L9 and L10-L12 represent respective critical zones Z7-Z9 and Z10-Z12 along the left and right side of the vehicle 10, as monitored by side sensors S7-S9 and S10-S12. For tractors 10A pulling two or three trailers (tandems or triples) each with side sensors mounted and connected as previously described, the associated left and right ALEDs L7-L9 and L10-L12 on vehicle mirror 50A, 50B may be controlled by LED controller 30 to illuminate in different colors in order to distinguish one trailer from another. In an alternative embodiment, additional adjacent columns of ALEDs may be added to the mirror 50A, 50B to represent the critical zones on the second and third trailers, respectively. Technology relating to addressable LED architecture, color-control, different pulse rates, and control circuitry is described further in prior U.S. Pat. Nos. 7,605,547 and 7,131,748, and prior published U.S. Application Pub. No. US 2013/0075769. The complete disclosures of these prior patents and application are incorporated by reference in the present application.

Additionally, Near Field Communication (NFC) tags with a mobile device app may be used to program the LED controller for certain driver preferences including, for example, ALED colors, pulse rate, and audible/tactical warnings. The NFC tags can be installed on the system devices for storing VRMS codes and may access an Internet website for warranty and pairing instructions.

In the present example, the object-detecting sensors and ALEDs operatively associate via LED controller 30, and correspond as follows:

Sensor S1 associates with ALED L1 representing zone Z1
Sensor S2 associates with ALED L2 representing zone Z2
Sensor S3 associates with ALED L3 representing zone Z3
Sensor S4 associates with ALED L4 representing zone Z4
Sensor S5 associates with ALED L5 representing zone Z5
Sensor S6 associates with ALED L6 representing zone Z6
Sensor S7 associates with ALED L7 representing zone Z7
Sensor S8 associates with ALED L8 representing zone Z8
Sensor S9 associates with ALED L9 representing zone Z9
Sensor S10 associates with ALED L10 representing zone Z10
Sensor S11 associates with ALED L11 representing zone Z11
Sensor S12 associates with ALED L12 representing zone Z12
Sensor S13 associates with ALED L13 representing zone Z13
Sensor S14 associates with ALED L14 representing zone Z14
Sensor S15 associates with ALED L15 representing zone Z15
Sensor S16 associates with ALED L16 representing zone Z16

Front and rear sensors S1-S4 and S13-S16 and their associated ALEDs L1-L4 and L13-L16 will provide driver awareness of obstacles in the front and rear of the vehicle 10 at start-up and when backing up. The ALEDs L1-L4 and L13-L16 may illuminate in different colors to represent the approximate distance of the obstacle (e.g., green for more than 4 ft, yellow for 2-4 ft, and red if less than 2 ft) to the front or rear of the vehicle 10.

FIG. 4-7 demonstrate exemplary operation of the present system and method. A motorcyclist "M" passing a tractor-trailer vehicle 10 on the right enters zone Z12 and is detected by sensor S12. This sensor S12 then activates its associated ALED L12 on the vehicle side mirror 50B—causing the ALED L12 to either illuminate, flash or change colors. As the motorcyclist "M" leaves zone Z12 and continues into zone Z11, the associated ALED L12 of sensor S12 deactivates and returns to its normal state, while the ALED L11 associated with sensor S11 activates (and either illuminates, flashes or changes colors). This process continues as the motorcyclist "M" is detected by sensors S10 and S6 while passing through zones Z10 and Z6, respectively, and activating and deactivating the associated ALEDs L10 and L6 on the mirror 50B.

In addition to the above, the exemplary LED controller 30 may incorporate (or interface with) pre-crash sensing technology comprising hardware, software and/or firmware designed for analyzing driver actions and then anticipating vehicle maneuvers based on those action. For example, eye tracking, 3D motion/gesture detection, and mind wave monitoring devices may be utilized to indicate a driver's intention to perform a particular vehicle maneuver prior to actually performing the maneuver. The following published patent applications describe the current state of the art with regards to this technology:

(a) U.S. Patent Application Pub. No. US 20140226131 entitled "Systems and methods of eye tracking calibration."

(b) U.S. Patent Application Pub. No. US 20150253860 entitled "E-field sensing of non-contact gesture input for controlling a medical device."

(c) Chinese Patent Application Pub. No. CN103647582 entitled "Bluetooth brain wave monitoring device", and Chinese Patent Application Pub. No. CN 103530986 entitled "Brain wave and Zigbee-based fatigue driving early-warning system."

The complete disclosures of the these published applications are incorporated by reference in the present application. The present vehicle may incorporate any one or more of the above devices.

Utilizing this current technology, any predetermined combination of eye glances, driver motions, and mind/brain wave patterns may signal an anticipated vehicle maneuver. For example, a motion/gesture detection device located in the cab of vehicle may monitor an area surrounding the steering wheel, and may determine (based on hand movement, turn signal activation, initial rotation of the steering wheel, or the like) that the driver intends to make a righthand or lefthand lane-change or turn. The device may then transmit an anticipated maneuver signal to the LED controller 30. If the maneuver is improper or unsafe, as determined by zone sensors S1-S16 described above, the LED controller 30 may transmit an alert signal to the ALEDs L1-L16 in mirror 50A, 50B causing all to simultaneously flash red. Additional alerts, such as driver seat vibration and/or an audible alarm, may active inside the cab of the vehicle. Physical characteristics of the driver can also be measured using various wearable sensors which monitor breathing pattern, heart rate, change in body temperature, and the like. This data may be communicated to the LED controller 30, processed, and compared against certain programmed danger thresholds. When a particular danger threshold is reached, the LED controller 30 may transmit an alert signal to wearable device and/or to the ALEDs L1-L16 in mirror 50A, 50B causing all to simultaneously flash red.

Automotive Short-Range Radar Sensors

Referring to FIGS. 8-13, in further exemplary embodiments, the present disclosure comprises a system and method which utilizes one or more multi-beam automotive UWB short-range radar (SRR) sensors 100 strategically mounted on the vehicle 110, and comprising respective microprocessors for defining and distinguishing (or parsing) critical zones ZZ1-ZZ6 located around the vehicle 110. The exemplary SRR sensor 100 comprises a radar transceiver, one or more antennas (e.g, beamforming or monopulse) designed for high gain and good signal-to-noise ratio, and other features and technology, such as described in prior U.S. Pat. No. 7,324,039. Further discussion regarding SRR sensors is provided in the article by Bloecher, Sailer, Rollmann, and Dickmann entitled "79 GHz UWB Automotive Short Range Radar—Spectrum Allocation and Technology Trends," and the paper by Mende and Zander entitled "A Multifunctional Automotive Short Range Radar System." The complete disclosures of the '039 Patent and the above articles are incorporated by reference in the present application. The exemplary SRR sensors may perform detection, tracking, and/or object classification.

Figure 8A:
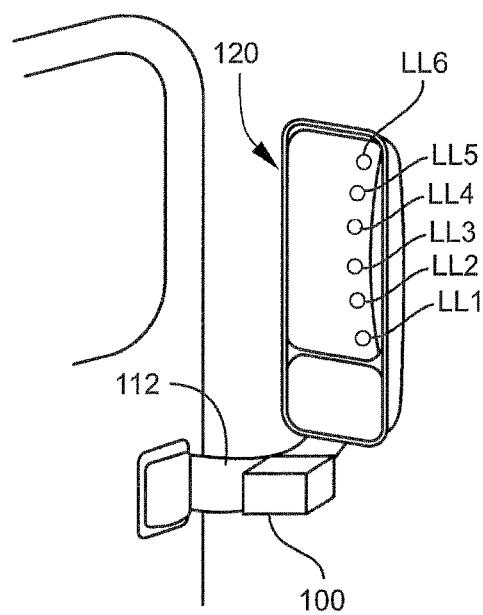
FIG. 8A is an enlarged view of the exemplary vehicle mirror and SRR sensor shown in FIG. 8.
Figure 8:
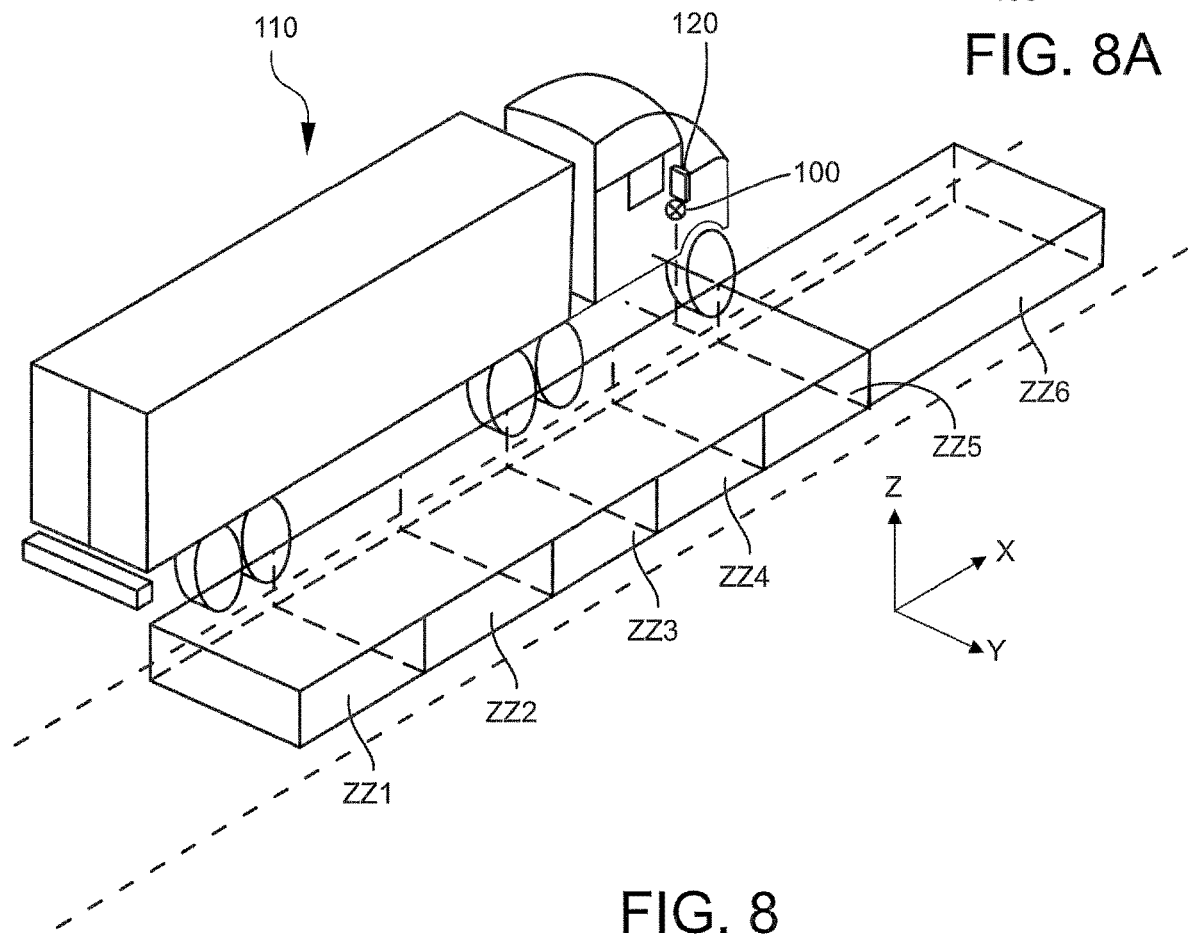
FIG. 8 is a perspective view of a tractor-trailer vehicle incorporating a SRR sensor for defining, distinguishing, and monitoring critical side zones around the vehicle.
Figure 9:
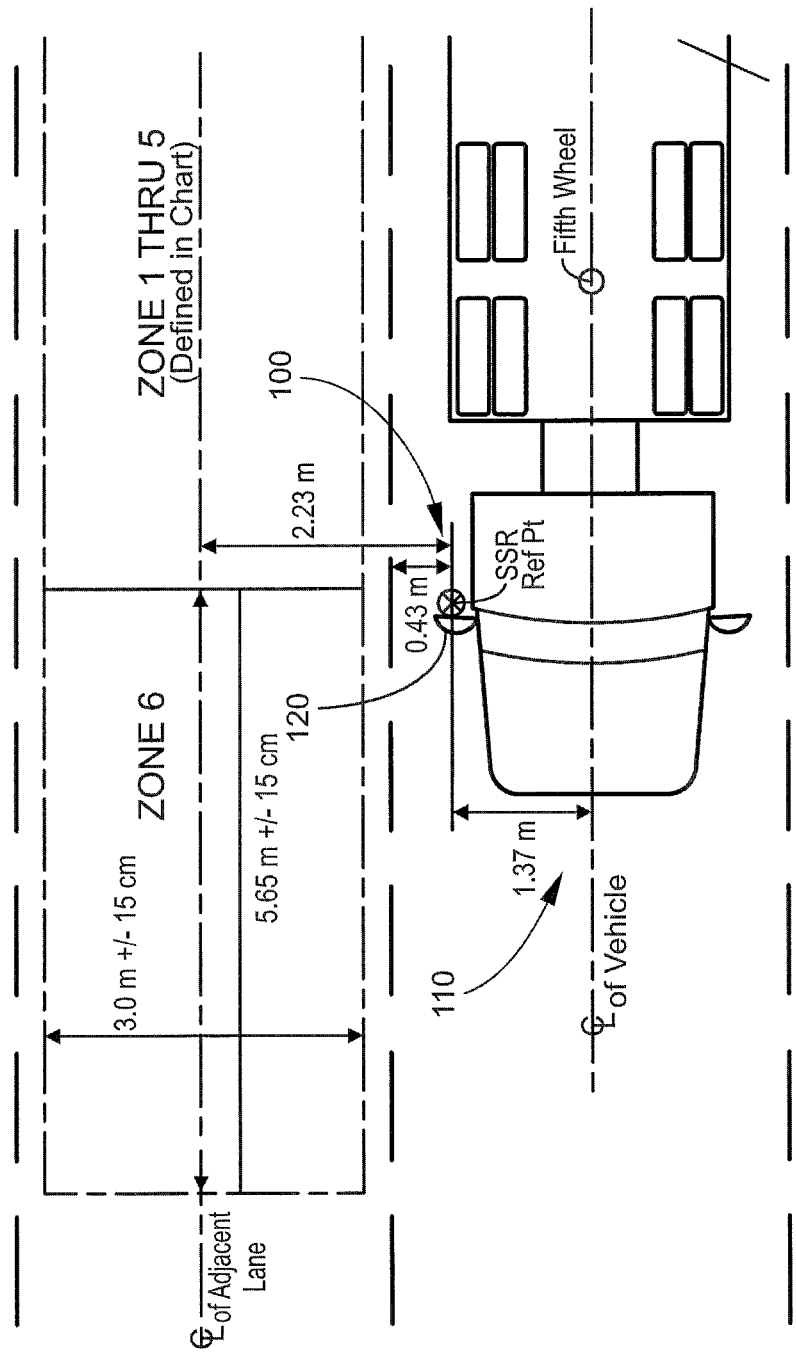
FIGS. 9-11 provide exemplary dimensions used to define and quantify the critical side zones illustrated in FIG. 8.
Figure 10:
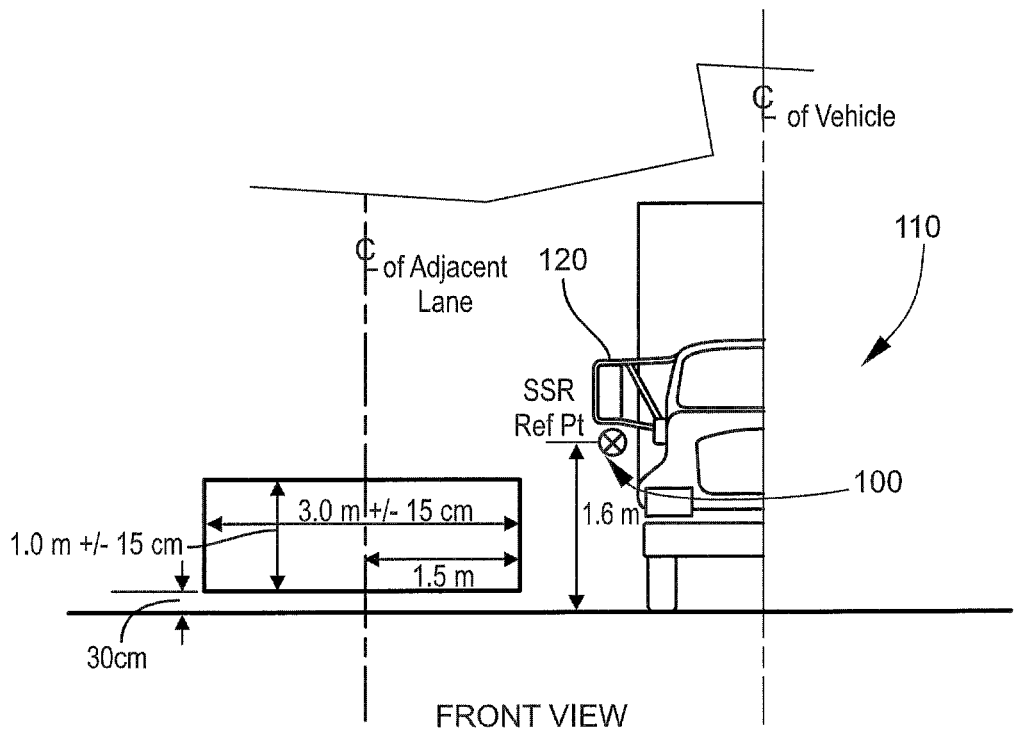
Figure 11:
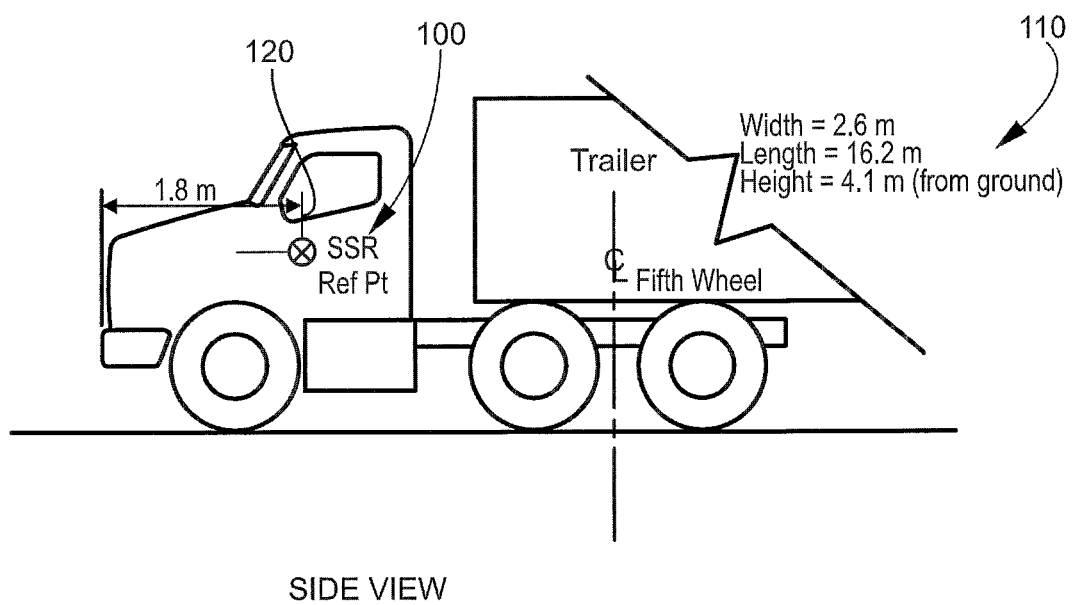
Figure 12:
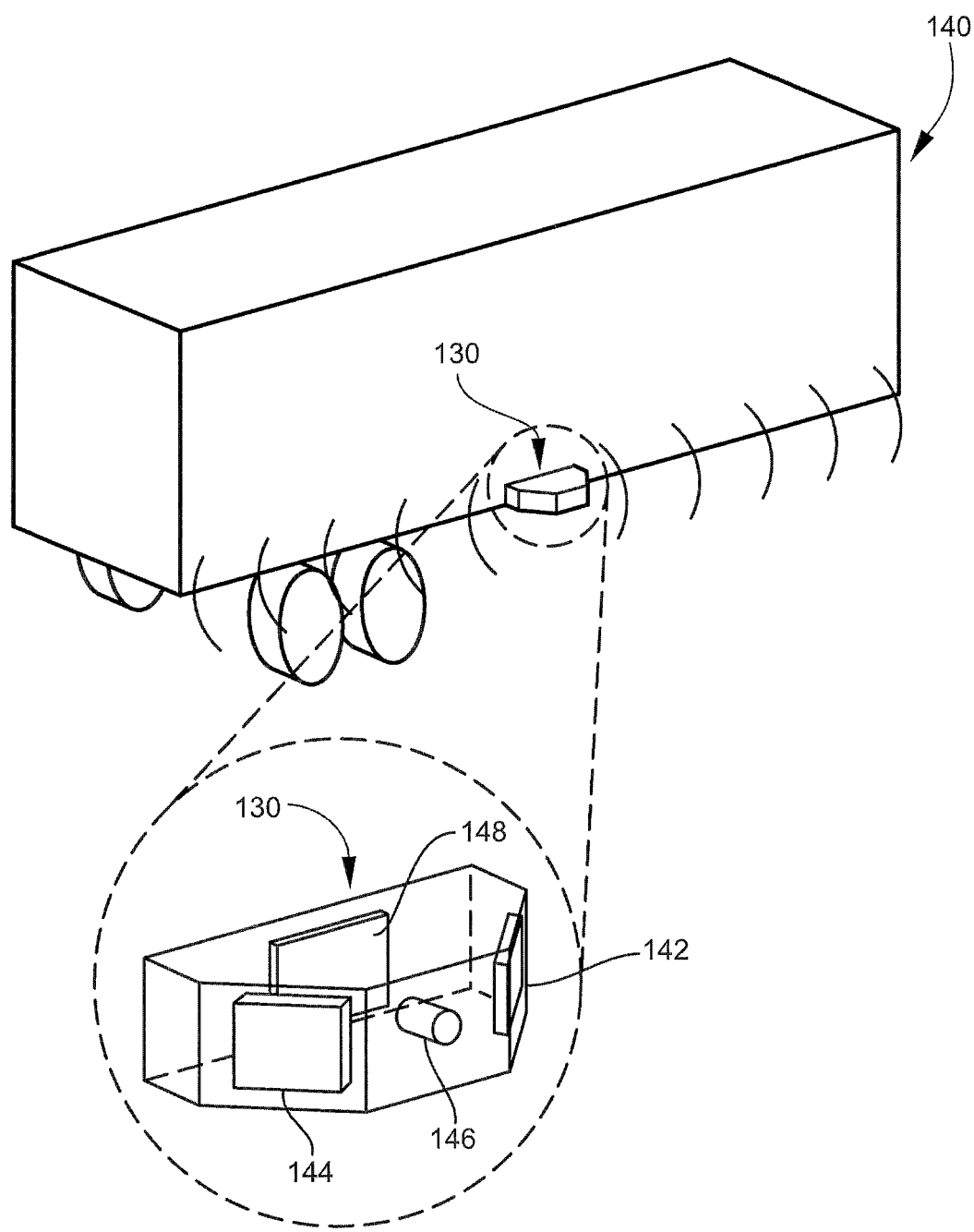
FIGS. 12 and 13 illustrate an additional SRR sensor mounted on the side of a second trailer, and the critical zones monitored by the additional SSR sensor and rear sensors.
Figure 13:
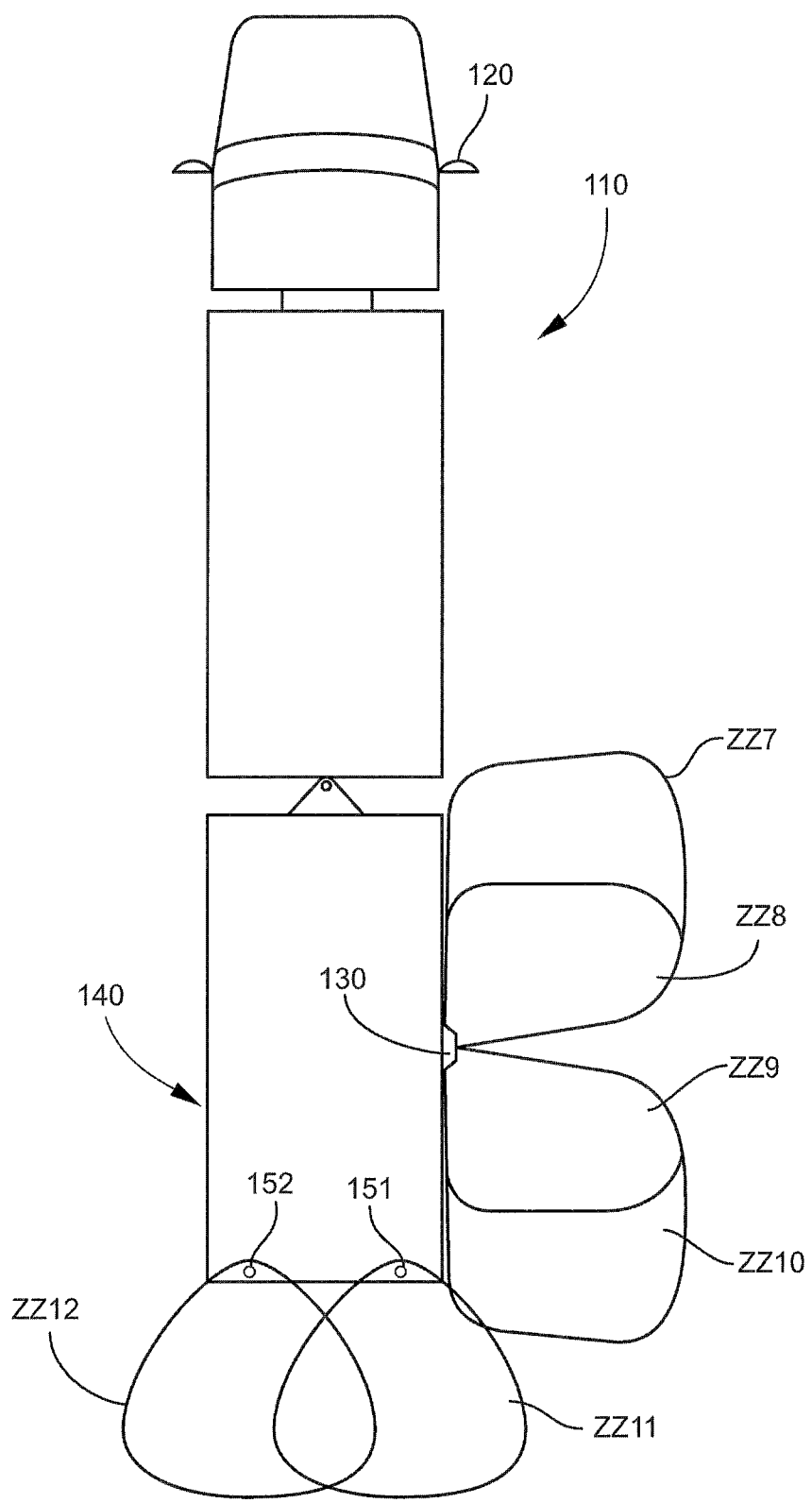

In the example shown in FIGS. 8 and 8A, tractor-trailer vehicle 110 comprises a single multi-beam SRR sensor 100 carried on a mounting arm 112 of the side mirror 120 at a reference point having (x, y, z) coordinates of (0, 0, 1.6 meters)—the z-coordinate being measured from the ground at distance 0. The SRR sensor 100 is programmed to define, distinguish, and monitor six (6) different critical zones ZZ1-ZZ6 shown and quantified in FIGS. 9-11. The SSR sensor 100 operatively associates each of the zones ZZ1-ZZ6 with ALEDs LL1-LL6 arranged in the side mirror 120, and cooperates with an integrated LED controller to selectively activate and deactivate the individual ALEDs LL1-LL6 when objects enter and leave the zones ZZ1-ZZ6. For example, referring to FIG. 8A:

Zone ZZ1 associates with ALED LL1
Zone ZZ2 associates with ALED LL2
Zone ZZ3 associates with ALED LL3
Zone ZZ4 associates with ALED LL4
Zone ZZ5 associates with ALED LL5
Zone ZZ6 associates with ALED LL6

The exemplary SSR sensor 100 may incorporate a forward facing SSR, rearward facing SSR, and a downward facing sonic sensor. In a further application of the present disclosure shown in FIGS. 12 and 13, a similar SSR sensor 130 may be mounted on the side a second trailer 140 to define, distinguish and monitor critical zones ZZ7-ZZ10. The exemplary SSR sensor 130 comprises a forward facing SSR 142, rearward facing SSR 144, and an outward facing sonic sensor 146—all connected to PC board 148 and communicating with the trailer's existing data buss. The SSR sensor 130 cooperates with an integrated LED controller to selectively activate and deactivate the individual ALEDs when objects enter and leave the zones ZZ7-ZZ10. Additional sonic sensors 151, 152 may be located on the rear of the trailer to monitor zones ZZ11 and ZZ12. In this example, the same mirror 120 shown in FIG. 8A incorporating ALEDs LL1-LL6 may be used to indicate perceived objects entering and leaving zones ZZ7-ZZ10. Zones ZZ7-ZZ10 may operatively associate with ALEDs LL3-LL6, respectively, while zones ZZ11 and ZZ12 may associate with ALEDs LL5 and LL6, respectively. The ALEDs LL1-LL6 indicate the zone ZZ1-ZZ12 which detects an object by illuminating in a distinct color (e.g., red, blue, or green). In other words, for objects entering in any of zones ZZ1-ZZ6 the associated ALEDS LL1-LL6 in mirror 120 would illuminate in the color blue. For objects entering in any of zones ZZ7-ZZ10 the associated ALEDs LL3-LL6 in mirror 120 would illuminate in the color green. For objects entering in either of zones ZZ11 or ZZ12 the associated ALEDS LL5 and LL6 in mirror 120 would illuminate in color red.

Figure 14:
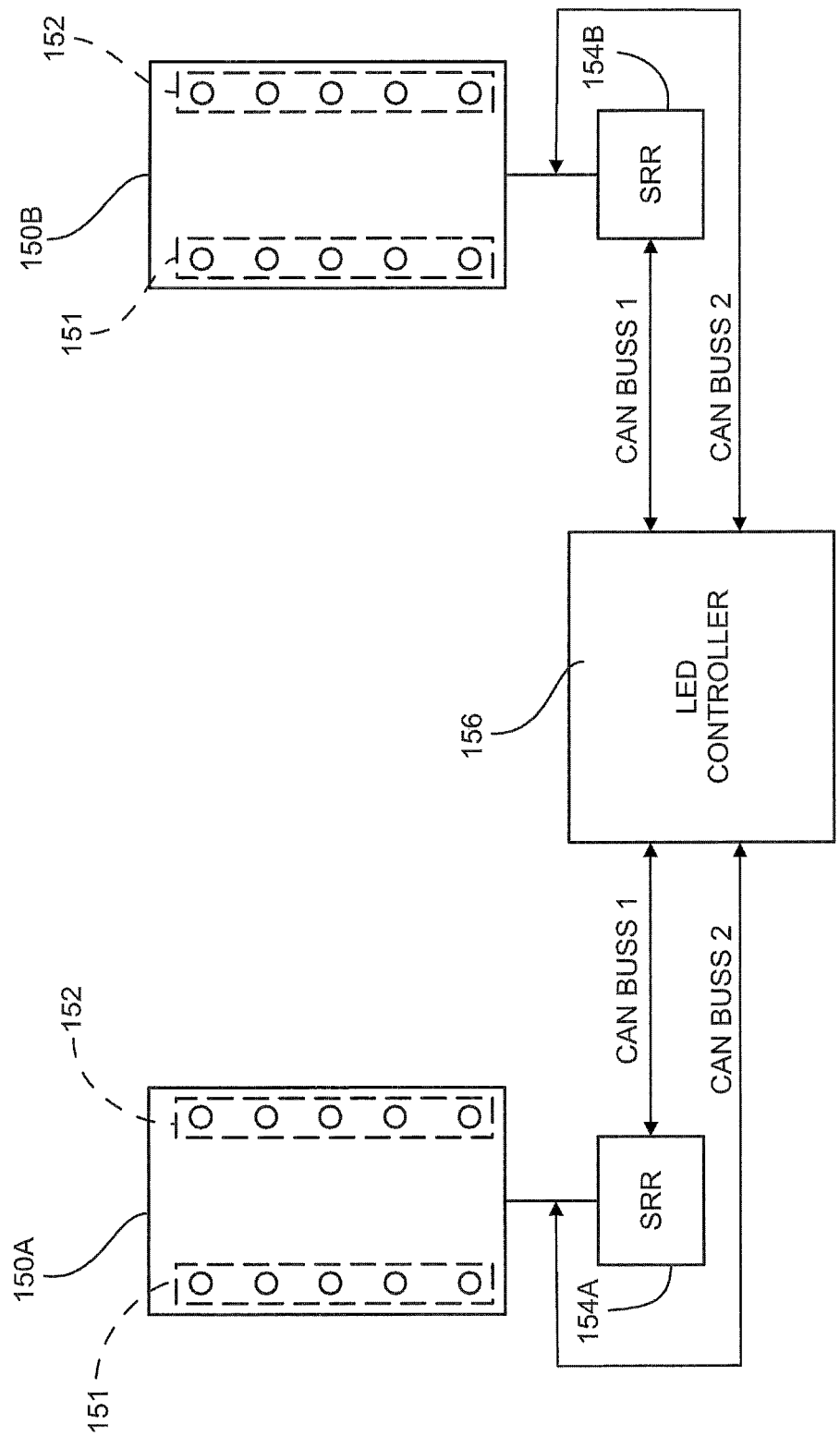
FIG. 14 is a schematic diagram illustrating exemplary connections between the SRR sensors, LED controller and ALED mirrors.

In a related embodiment represented schematically in FIG. 14, each side mirror 150A, 150B of the vehicle may incorporate opposing columns 151, 152 of closely spaced ALEDs. Multi-beam SRR sensors 154A, 154B are mounted adjacent respective side mirrors 150A, 150B, and operate in a manner identical to SSR sensor 130 previously described. The ALEDs in columns 151, 152 associate with critical zones on opposite sides of the vehicle, and are located and function in both side mirrors 150A, 150B in an identical manner. Each SRR sensor 154A, 154B comprises a microprocessor, radar transceiver, one or more antennas, and other standard features and technology known in the art. The SRR sensors 154A, 154B operatively connect to an LED controller (microprocessor) 156 via CANN buss 1, while the LED controller 156 further operatively connects to the ALEDs in mirrors 150A, 150B via CANN buss 2. CANN buss 1 may also connect to the vehicle's speedometer, such that the LED controller remains in a sleep mode as the vehicle travels below a predetermined threshold speed. The exemplary system may also enable bidirectional transmission of diagnostic system information between vehicle and telematic systems (e.g. systems designed/serviced by PeopleNet and Zonar Systems). Diagnostic data from LED controller is offloaded via vehicle's data buss (i.e. CANN buss), BLUETOOTH, and/or WIFI, and programs are uploaded/updated via satellite or cellular transmission using telematic systems. CANN buss 2 may connect to the vehicle's electronic onboard recorder (EOBR) which may record and store information regarding the activation/deactivation of various ALEDs in mirrors 150A, 150B.

Figure 15:
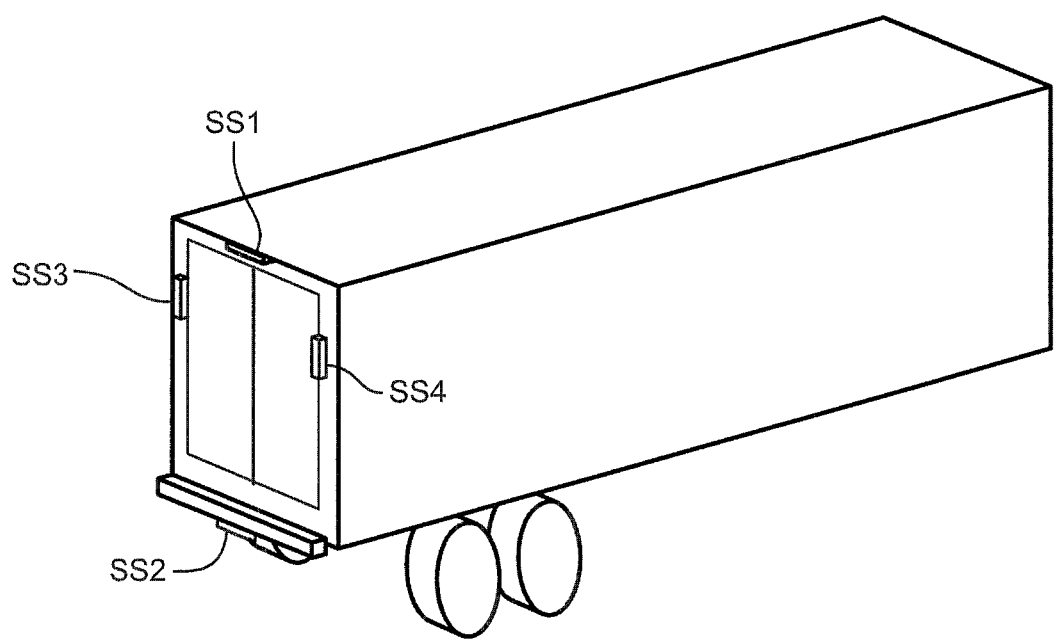
FIGS. 15-17 illustrate a further exemplary application of the present system and method.
Figure 16:
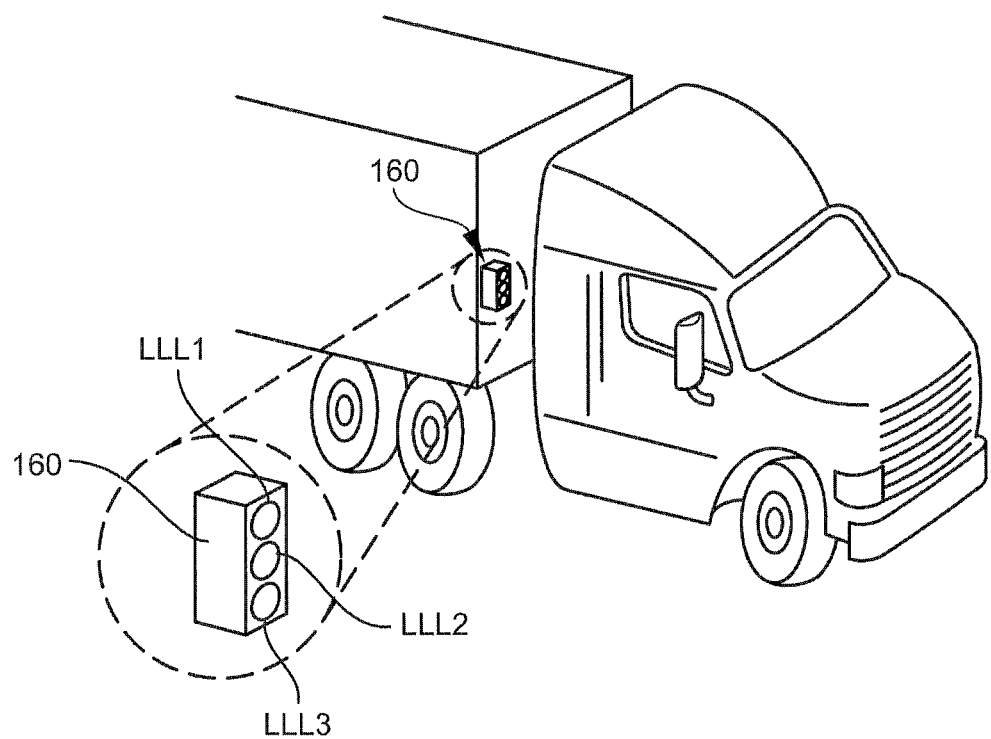
Figure 17:
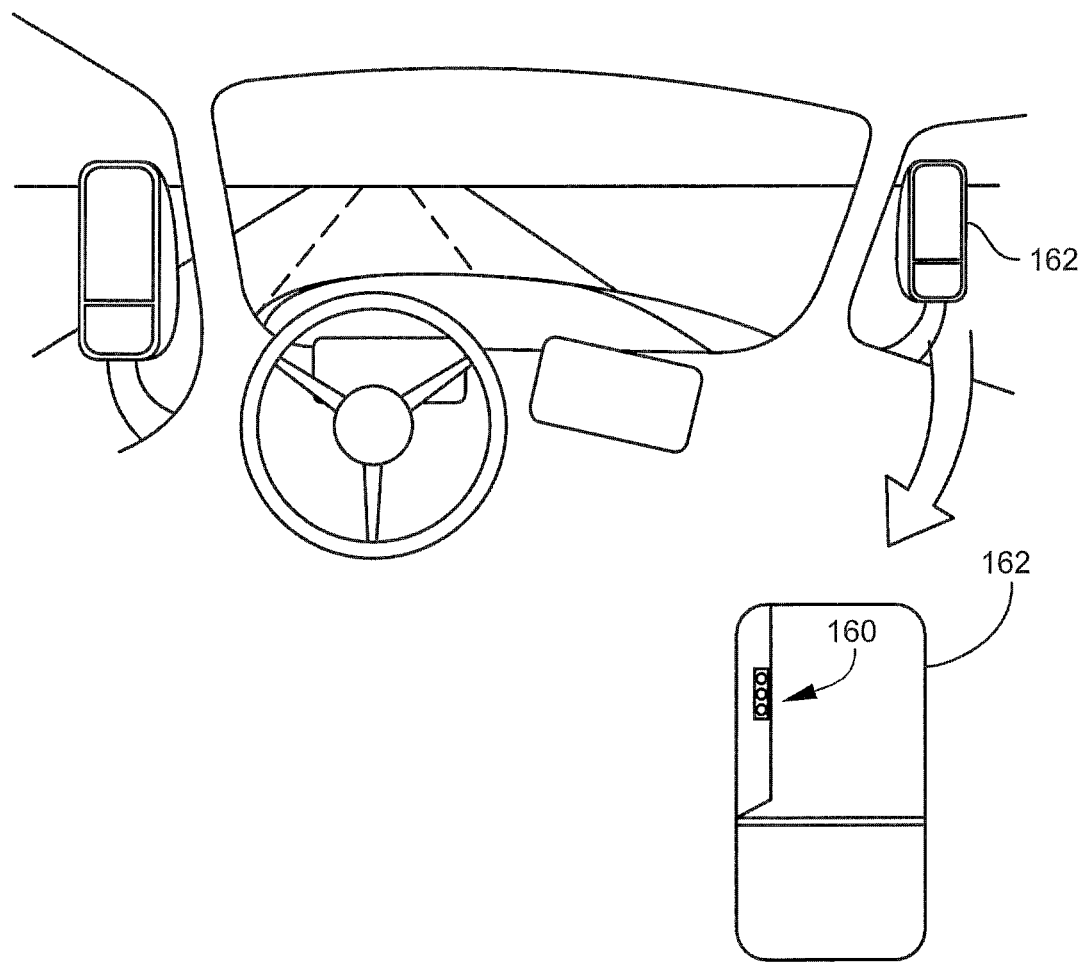

Referring to FIGS. 15, 16, and 17, in yet another exemplary embodiment, vehicle sensors SS1-SS4 are located at the rear of the trailer along top and bottom edges and opposing sides. These sensors SS1-SS4 operatively associate, as previously described, with ALEDs LLL1-LLL3 housed in a display box 160 mounted at a front edge of the trailer. The sensors SS1-SS4 detect objects behind the trailer. When backing up, the ALEDs LLL1-LLL3 may change colors as the vehicle approaches an object, and the color change may be different for each individual ALED LLL1-LLL3. For example, if the top sensor SS1 detects an overhead object at a distance of 2 ft the associated ALED LLL1 may change color from yellow to red, whereas the ALEDs LLL2 and LLL3 associated with the side sensors SS2, SS3 and bottom sensor SS4 may remain yellow or green. In this example, the ALED display box 160 is strategically mounted on the trailer for being readily viewed by the driver using the side mirror 162.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A method for enhancing driver situation awareness and environment perception around a transportation vehicle, comprising:
   locating a plurality of object detecting sensors on the vehicle, the sensors being arranged for monitoring a corresponding plurality of critical zones located around the vehicle;
   operatively pairing a plurality of addressable light-emitting diodes with the object detecting sensors;
   locating the addressable light-emitting diodes on the vehicle for visual display to the driver, wherein locating the addressable light-emitting diodes on the vehicle comprises integrating the addressable light-emitting diodes in a display mounted on a trailer pulled by the vehicle and located for visual display to the driver through a rearwardly directed exterior mirror mounted on the vehicle, and arranging the light-emitting diodes in separate top, bottom, right, and left lines along respective top, bottom, right, and left marginal edges of the display, and wherein each of the addressable light-emitting diodes in the display represents one of the plurality of critical zones around the vehicle;
   when a given sensor detects an object in the critical zone, transmitting a detection signal to a LED controller; and
   upon receiving the detection signal, the LED controller transmitting a control signal to selectively activate only those addressable light-emitting diodes which are associated with the given sensor, such that the activated light-emitting diodes visually communicate to the driver a location of the detected object in the critical zone; and
   tracking realtime movement of the detected object throughout the plurality of critical zones around the vehicle by selectively activating and deactivating the addressable light-emitting diodes, wherein movement of the detected object into a first critical zone activates a first addressable light-emitting diode in the display, and further movement of the detected object outside of the first critical zone and into an adjacent second critical zone deactivates the first addressable light-emitting diode and activates a second addressable light-emitting diode, the second addressable light-emitting diode being located in the display adjacent the first addressable light-emitting diode; and
   illuminating the light-emitting diodes in the display in different colors in order to distinguish different ones of the plurality of critical zones around the vehicle.

2. The method according to claim 1, wherein the display is located inside a cab of the vehicle.

3. The method according to claim 1, wherein the display is mounted on a pillar inside the cab of the vehicle.

4. The method according to claim 1, wherein the display comprises a LCD display.

5. The method according to claim 1, wherein said addressable light-emitting diodes selectively activate and deactivate when objects enter and leave the critical zone.

6. The method according to claim 1, wherein the object detecting sensors comprise a plurality of radar transceivers adapted to direct radar waves into the critical zone, and to receive reflected radar waves from any objects located in the critical zone.

7. The method according to claim 6, wherein the radar transceivers comprise short-range radar.

8. The method according to claim 6, wherein the plurality of radar transceivers comprise at least one pair of forward facing and rearward facing short-range radars.

9. A system for enhancing driver situation awareness and environment perception around a transportation vehicle, said system comprising:
- a plurality of object detecting sensors adapted for being located on the vehicle and arranged for monitoring a corresponding plurality of critical zones located around the vehicle;
- a plurality of addressable light-emitting diodes operatively associated with said object detecting sensors, and adapted for being located on the vehicle for visual display to the driver, wherein the addressable light-emitting diodes are integrated in a display mounted on a trailer pulled by the vehicle and located for visual display to the driver through a rearwardly directed exterior mirror mounted on the vehicle, and arranged in separate top, bottom, right, and left lines along respective top, bottom, right, and left marginal edges of the display, and wherein each of the addressable light-emitting diodes in the display represents one of the plurality of critical zones around the vehicle; and
- a LED controller adapted for receiving a detection signal when a given sensor detects an object in the critical zone, and for transmitting a control signal to selectively activate only those addressable light-emitting diodes which are associated with said given sensor, such that said activated light-emitting diodes visually communicate to the driver a location of the detected object in the critical zone; and
- said LED controller tracking realtime movement of the detected object throughout the plurality of critical zones around the vehicle by selectively activating and deactivating the addressable light-emitting diodes, wherein movement of the detected object into a first critical zone activates a first addressable light-emitting diode in the display, and further movement of the detected object outside of the first critical zone and into an adjacent second critical zone deactivates the first addressable light-emitting diode and activates a second addressable light-emitting diode, the second addressable light-emitting diode being located in the display adjacent the first addressable light-emitting diode; and
- said LED controller illuminating the light-emitting diodes in the display in different colors in order to distinguish different ones of the plurality of critical zones around the vehicle.

10. The system according to claim 9, wherein said display is adapted for being located inside a cab of the vehicle.

11. The system according to claim 10, wherein said display is adapted for mounting on a pillar inside the cab of the vehicle.

12. The system according to claim 9, wherein said display comprises a LCD display.

13. The system according to claim 9, wherein said addressable light-emitting diodes are adapted to selectively activate and deactivate when objects enter and leave the critical zone.

14. The system according to claim 9, wherein said object detecting sensors comprise a plurality of radar transceivers adapted for directing radar waves into the critical zone, and for receiving reflected radar waves from any objects located the critical zone.

15. The system according to claim 14, wherein said radar transceivers comprise at least one pair of forward facing and rearward facing short-range radars.

16. A transportation vehicle comprising a system for enhancing driver situation awareness and environment perception, said transportation vehicle comprising:
- a plurality of object detecting sensors adapted for being located on said vehicle and arranged for monitoring a corresponding plurality of critical zones located around said vehicle;
- a plurality of addressable light-emitting diodes operatively associated with said object detecting sensors, and adapted for being located on said vehicle for visual display to the driver, wherein the addressable light-emitting diodes are integrated in a display mounted on a trailer pulled by the vehicle and located for visual display to the driver through a rearwardly directed exterior mirror mounted on the vehicle, and arranged in separate top, bottom, right, and left lines along respective top, bottom, right, and left marginal edges of the display, and wherein each of the addressable light-emitting diodes in the display represents one of the plurality of critical zones around said vehicle; and
- a LED controller adapted for receiving a detection signal when a given sensor detects an object in the critical zone, and for transmitting a control signal to selectively activate only those addressable light-emitting diodes which are associated with said given sensor, such that said activated light-emitting diodes visually communicate to the driver a location of the detected object in the critical zone; and
- said LED controller tracking realtime movement of the detected object throughout the plurality of critical zones around said vehicle by selectively activating and deactivating the addressable light-emitting diodes, wherein movement of the detected object into a first critical zone activates a first addressable light-emitting diode in the display, and further movement of the detected object outside of the first critical zone and into an adjacent second critical zone deactivates the first addressable light-emitting diode and activates a second addressable light-emitting diode, the second addressable light-emitting diode being located in the display adjacent the first addressable light-emitting diode; and
- said LED controller illuminating the light-emitting diodes in the display in different colors in order to distinguish different ones of the plurality of critical zones around said vehicle.

* * * * *